(12) United States Patent
Jiang (10) Patent No.: US 8,914,395 B2
(45) Date of Patent: Dec. 16, 2014

(54) DATABASE QUERY TRANSLATION SYSTEM (71) Applicant: UpToDate, Inc., Waltham, MA (US)

(72) Inventor: Tongzhang Jiang, Carlisle, MA (US)

(73) Assignee: UpToDate, Inc., Waltham, MA (US)

( * ) Notice: Subject to any disclaimer, the term of this patent is extended or adjusted under 35 U.S.C. 154(b) by 94 days.

(21) Appl. No.: 13/733,858

(22) Filed: Jan. 3, 2013

(65) Prior Publication Data
US 2014/0188856 A1    Jul. 3, 2014

(51) Int. Cl.
G06F 17/30    (2006.01)

(52) U.S. Cl.
CPC .... *G06F 17/30427* (2013.01); *G06F 17/30669* (2013.01); *Y10S 707/941* (2013.01)
USPC ................ 707/760; 707/723; 707/941; 704/8

(58) Field of Classification Search
CPC .......... G06F 17/30427; G06F 17/3043; G06F 17/30439
USPC ......... 707/723, 748, 750, 756, 764, 765, 803, 707/804, 807, 809, 912, 917, 941, 751, 755, 707/760, 770; 704/2, 5, 7, 8; 705/1.1, 2
See application file for complete search history.

(56) References Cited

U.S. PATENT DOCUMENTS

| | | | |
|---|---|---|---|
| 4,158,236 A | 6/1979 | Levy | |
| 4,502,128 A | 2/1985 | Okajima et al. | |
| 5,675,815 A | 10/1997 | Yamauchi et al. | |
| 5,907,821 A | 5/1999 | Kaji et al. | |
| 6,085,162 A | 7/2000 | Cherny | |
| H2098 H | 3/2004 | Lee et al. | |
| 6,748,353 B1 * | 6/2004 | Iliff | 704/9 |
| 6,876,963 B1 | 4/2005 | Miyahira et al. | |
| 6,885,985 B2 | 4/2005 | Hull | |
| 6,937,974 B1 | 8/2005 | d'Agostini | |
| 6,996,520 B2 | 2/2006 | Levin | |
| 6,999,916 B2 | 2/2006 | Lin et al. | |
| 7,254,531 B2 | 8/2007 | Nir | |
| 7,433,894 B2 | 10/2008 | Drissi et al. | |
| 7,769,578 B2 | 8/2010 | Itoh et al. | |
| 7,860,706 B2 | 12/2010 | Abir | |

(Continued)

FOREIGN PATENT DOCUMENTS

WO    WO-2002/098822 A2    12/2002
WO    WO-2010/022866 A2    3/2010

OTHER PUBLICATIONS

International Search Report and Written Opinion for PCT/US2013/078402 dated Apr. 3, 2014.

*Primary Examiner* — Greta Robinson
(74) *Attorney, Agent, or Firm* — Marshall, Gerstein & Borun LLP (57) ABSTRACT

In a method for translation of a medical database query from a first language into a second language, a query to be translated is received from a use of the medical database. A respective translation for the query from each of several translation engines is obtained, and a respective ranking score for each of the obtained translations is determined. The determined ranking scores are then utilized to select a translations from the several obtained translations. The selected translation is then provided to the user and/or is used to search the medical database to obtain search results for the query and the obtained search results are then provided to the user.

20 Claims, 5 Drawing Sheets

(56) References Cited

U.S. PATENT DOCUMENTS

| | | |
|---|---|---|
| 8,050,906 B1 | 11/2011 | Zimmerman et al. |
| 8,204,735 B2 * | 6/2012 | Kamatani et al. ............ 704/4 |
| 8,209,164 B2 | 6/2012 | Etzioni et al. |
| 8,249,855 B2 | 8/2012 | Zhou et al. |
| 2002/0002452 A1 | 1/2002 | Christy et al. |
| 2007/0022134 A1 | 1/2007 | Zhou et al. |
| 2007/0094051 A1 * | 4/2007 | Banks ............ 705/3 |
| 2008/0235202 A1 | 9/2008 | Wang et al. |
| 2008/0306729 A1 * | 12/2008 | Drissi et al. ............ 704/8 |
| 2012/0101804 A1 * | 4/2012 | Roth et al. ............ 704/2 |
| 2012/0136648 A1 * | 5/2012 | Elliot et al. ............ 704/2 |
| 2012/0330990 A1 * | 12/2012 | Chen et al. ............ 707/761 |
| 2014/0012563 A1 * | 1/2014 | Caskey et al. ............ 704/2 |
| 2014/0114642 A1 * | 4/2014 | van den Oever et al. ...... 704/2 |

\* cited by examiner

DATABASE QUERY TRANSLATION SYSTEM

TECHNICAL FIELD

The present application relates generally to language translation and, more specifically, to systems and methods for translating database queries.

BACKGROUND

A literature database is a collection of literary works, such as papers, articles, books, etc. searchable by users for retrieval of information of interest to the users. Some literary databases are general in nature and contain literary works on a variety of subjects, while others are specific to a particular subject or to subjects related to a particular field. A medical literature database, for example, is a collection of literary works pertaining to the medical field, such as medical journal articles, medical studies, and the like. Medical databases are utilized, for example, by physicians or other medical personnel to retrieve literary works that may assist medical personnel in diagnosing and/or treating patients. As another example, medical databases may also be utilized as learning tools for medical students, medical patients, or people in general interested in obtaining information about a particular medical condition or on any other subject related to the medical field.

To search a literature database, a user generally enters a query, which may be a word or a phrase that describes the subject or subjects of interest to the user, and the query may then be used to search the database to obtain from the database materials relevant to the query. Literature databases in general, and medical literature databases in particular, have become widely available for access by users worldwide. For example, users may be able to access a literature database by utilizing an on-line application that allows the user to enter a query into a webpage and to receive search results obtained based on the query via the internet. Thus, anyone with access to the internet may be able to search the database and to utilize materials obtained from the database. As a result, such databases are often utilized by users who are not native speaker of the language of literature contained in the databases. It is beneficial, therefore, to includes translation capabilities in a database to allow foreign language users to enter queries for searching the database and to translate the queries into the language of literature contained in the database.

DETAILED DESCRIPTION

Figure 1:
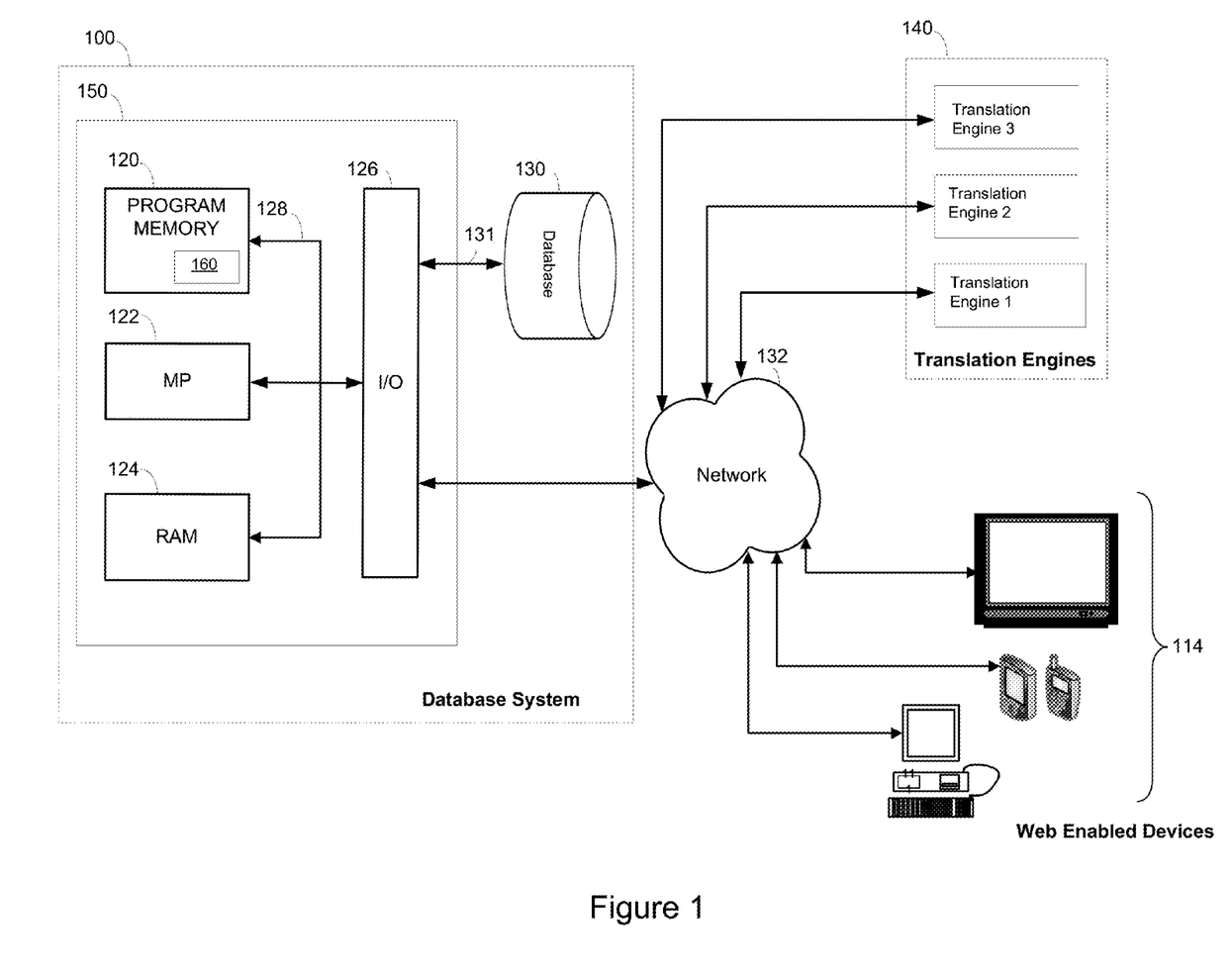
FIG. 1 is a block diagram of an example database system that utilizes a translation tool to perform database query language translation, in accordance with an embodiment of the present disclosure.

FIG. 1 is a block diagram of an example database system 100 that utilizes a translation tool for performing translation of database queries from a first language into a second language, in accordance with an embodiment of the present disclosure. The database system 100 includes a database 130, which may be, by way of example, a medical database that contains literature (e.g., medical journal articles, medical papers, etc.) on a variety of subjects related to the medical field. The database system 100 accepts foreign language queries for searching the database 130 and utilizes the database 130 (e.g., the literature containing in the database 130 and/or a record of native language queries previously processed by the database system 100) to provide accurate translations for the foreign language queries into the native language of literature contained in the database 130, as will be described in more detail below. The database system 100 may provide the translated query to the user and/or may utilize the translated query to retrieve relevant materials from the database 130 and may then provide the retrieved materials to the user. In some embodiments, the database 130 may be a multi-language database that contains literature in several languages. In such embodiments, the database 130 may be utilized to produce translations for a foreign language query into a subset of each one of the several languages.

FIG. 1 depicts several web-enabled devices 114 that may allow a user to communicate with the database system 100 via a digital network 132. The web-enabled device 114 may include, for example, personal computers, cellular phones, smart phones, web-enabled televisions, and other suitable web-enabled devices communicatively connected to database system 100 through the digital network 132. A user of the data base system 100 may access the database system 100 via a web-enabled device 114, for example by entering a query into an application, such as a web browser client, that provides a user interface for accessing the database system 100. In general, a user may utilize any type of interface provided to the user for accessing the database system 100, including a proprietary interface, and the interface may provide communication with the database system 100 using any type of protocol including, but not limited to, file transfer protocol (FTP), telnet, hypertext transfer protocol (HTTP), etc. The web-enabled devices 114 need not necessarily communicate with the network 132 via a wired connection. In some instances, the web enabled devices 114 may communicate with the network 132 via wireless signals and using any suitable wireless communications protocols and, in some instances, may communicate with the network 130 via an intervening wireless or wired device (not shown), which may be a wireless router, a wireless repeater, a base transceiver station of a mobile telephony provider, etc.

As illustrated in FIG. 1, the database system 100 includes a controller 150 operationally coupled to the database 130 via a connection 131. The controller 150 includes a program memory 120, a processor 122 (may be called a microcontroller or a microprocessor), a random-access memory (RAM) 124, and the input/output (I/O) circuit 126, all of which are interconnected via an address/data bus 128. The program memory 120 includes a translation module 160 that may include computer readable instructions executable on the processor 122, for example. When executed on the processor 122, the computer readable instruction may cause the processor to perform foreign language query translation in accordance with various embodiments described below. It should be appreciated that although only one processor 122 is shown, the controller 150 may include multiple processors 122, and several processor 122 may be used to execute the translation module 160. Similarly, the memory of the controller 150 may include multiple RAMs 124 and/or multiple program memories 120. Further, although the I/O circuit 126 is shown as a single block, it should be appreciated that the I/O circuit 126 may include a number of different types of I/O circuits. The RAM(s) 124 and the program memory (or memories) 120 may be implemented as semiconductor memories, magnetically readable memories, and/or optically readable memories, for example. A link 135 may operatively connect the controller 150 to the digital network 132 through the I/O circuit 126. It should be appreciated that although only one controller 150 is shown in FIG. 1, the database system 100 may include multiple controllers 150, and execution of the translation module 160 may be distributed over several controllers 150.

In order to produce a translation for a foreign language query, the translation module 160 may operate to submit the foreign language query to each of translation engines 140 which are communicatively coupled to the database system 100 via the digital network 132. Alternatively, or in addition to, submitting the foreign language query to the translation engines 140 over the digital network 132, the translation module 160 may operate to submit the foreign language query to one or several translation engines (not shown) stored in memory internal to the controller 150 (e.g., in the program memory 120 of the controller 150) that may be executed on one or more processors 122 of the controller 150. In response to submitting the query to the translation engines 140, the translation module 160 may receive a respective translation for the query from each one of the translation engines 140. The translation module 160 may then operate to select a "most accurate" translation from the plurality of translations received from the translation engines 140. Several selection criteria for selecting a translation form a plurality of received translations, in accordance with some embodiments, are described in more detail below. The translation engines 140 may include any translation services available on-line or in another suitable manner from a variety of translation engine providers. In the example embodiment illustrated in FIG. 1, a translation engine 140*a* may be an on-line translation engine provided by Google, a translation engine 140*b* may be an on-line translation tool provided by Microsoft (e.g., Bing), and the translation engine 140*c* may be an on-line translation tool provided by Babylon. These specific translation engines are only provided by way of example, however, and other suitable translation tools may be utilized by the database system 100 in other embodiments. Moreover, although FIG. 1 depicts three translation engines 140, the database system 100 may be coupled to and may utilize any other suitable number (e.g., 2, 4, 5, 6, etc.) of translation engines 140 in other embodiments.

Figure 2:
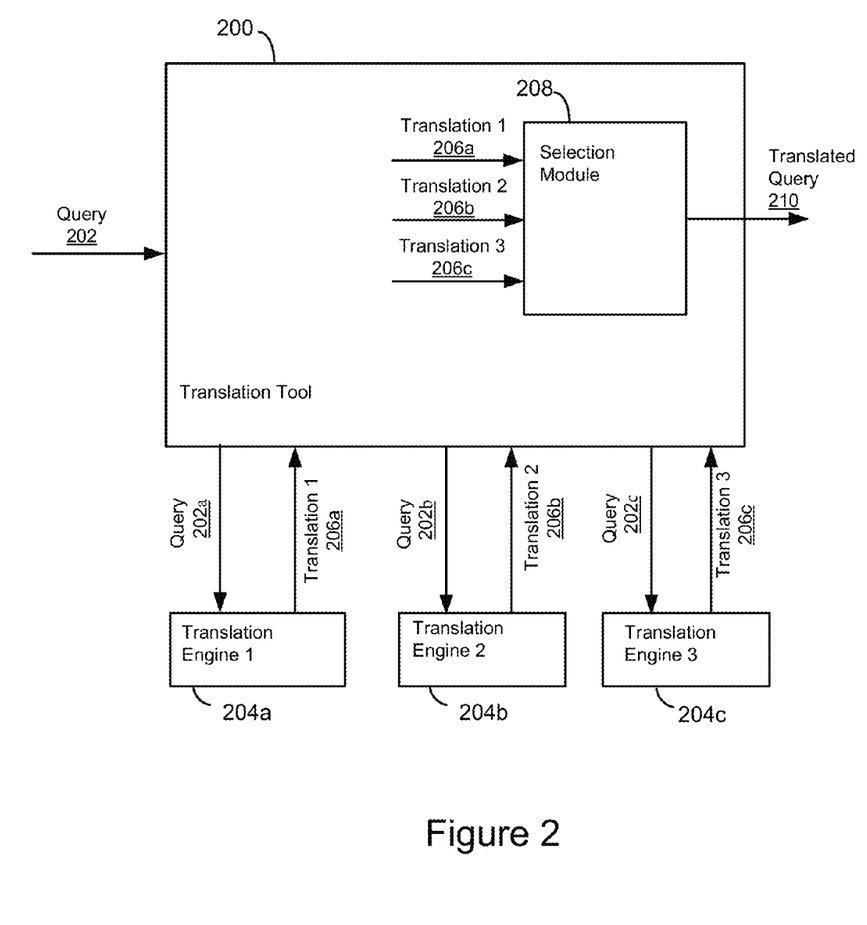
FIG. 2 is a block diagram of an example implementation of a database query translation tool.

FIG. 2 is a block diagram of an example translation tool 200 that may be an example implementation of the translation module 160 of FIG. 1. As illustrated in FIG. 2, the translation tool 200 receives as an input a query 202 and produces as an output a translation 204. The input query 202 may be a foreign language word or phrase entered by a user and may be intended to search a database (e.g., the database 130 of FIG. 1) to retrieve relevant information from the database, or may be provided to the database for the purpose of receiving a translation for the query into the native language of literature contained in the database. With reference to FIG. 1, the query 202 may be entered by the user into a web enabled device 114 and may be transmitted to the database system 100 via a the digital network 132. The translation tool 200 receives the query 202 and causes the query 202 to be transmitted (e.g., via the digital network 132 of FIG. 1) to multiple translation engines 204 (which correspond to the translation engines 144 of FIG. 1, for example). Although three translation engines 204 are illustrated in FIG. 2, the query 202 is transmitted to other suitable numbers (e.g., 2, 4, 5, 6, etc.) of translation engines 204 in other embodiments. In response to transmitting the query 202 to the translation engines 204, the translation tool 200 may receive a respective translation 206 from each of the translation engines 204. The received translations 206 are provided to a selection engine 208 which may operate to select a best, or most accurate translation 204 from the multiple received translations 206. The selected translation 204 may then be transmitted to the user and/or may be used to search a database (e.g., the database 130 of FIG. 1), and the search results obtained using the selected translation 204 may transmitted to the user.

Figure 3:
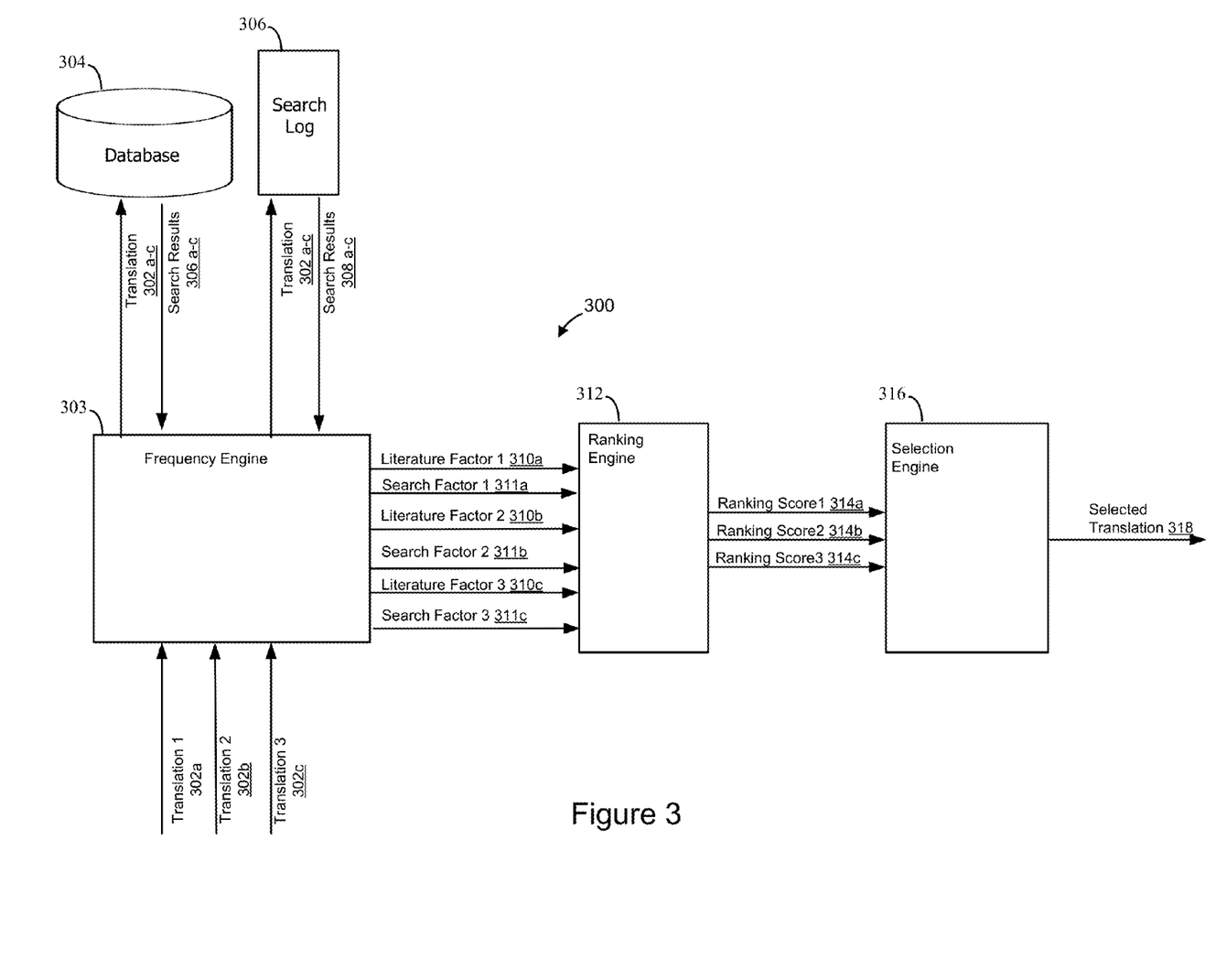
FIG. 3 is a block diagram of an example selection engine for selecting a translation from several possible translations.

FIG. 3 is a block diagram of an example selection engine 300 for selecting a translation from multiple possible translations, according to one embodiment. The selection engine 300 corresponds to one example implementation of the selection engine 208 of FIG. 2. The selection engine 300 is coupled to a database 304 and is generally used to produce a translation for a foreign language query entered by a user for searching the database 304. In general, the selection engine 300 receives a plurality of translations 302 (e.g., obtained from a plurality of translation engines) and selects a "most accurate" translation from the plurality of translations 302. The "most accurate" translation may be defined, for example, as the translation that would most likely be used by a native speaker of the language native to the database 304. Accordingly, to select the best translation, the translation engine 300 may apply one or more selection criteria based on likelihood of use of the translations 302 by native speakers of the language native to the database 304. Selection criteria for selecting the most accurate translation from the multiple possible translations 302 may include, for example, a "literature" criterion which may be based on a frequency of appearance of each of the translations 302 in a corpus of literature, such as in the literature contained in the database 304. The selection criteria may additionally or alternatively include a "search" criterion which may be based on a frequency of appearance of the translations 302 in a search log (or search logs) 306 or in another record of queries previously used to access the database 304.

To determine the literature selection criteria and/or the search log selection criteria, the selection engine 300 may utilize a frequency engine 303 communicatively coupled to the database 304 and/or to the search log (or search logs) 306, or, more specifically to a memory that contains the search log (or search logs) 306. To determine the literature criterion, for example, the frequency engine 303 may utilize each of the translations 302 to search the database 304 to obtain search results 306 for each translation 302 which may contain literature retrieved from the database 304 based on the translation 302. The frequency engine 303 may then determine the number of times each translation 302 appears in the literature provided for each translation 302 by the search results 306. In an embodiment, the frequency engine 303 determines or generates a respective literature factor 310 for each of the translations 302. The respective literature factor 310 generated or determined for a translation 302 indicates the number of times the translation 302 appears in literature contained in the database 304. In some embodiments, the respective literature factor 310 for each translation 302 is determined based on a weighted sum of frequencies of appearance of the translation 302 in different components of the literature provided by the search results 306. For example, the frequency engine 303 may determine the number of times the translation 302 appears in each one of several components of literature provided by the search results 306, such as in different sections (e.g., title, abstract, text, keywords, etc.) of articles, books, etc. provided by the search results 306, and may apply respective weighting factors to the determined frequencies of appearance in different components of the literature. As an example, frequency of appearance of a translation in titles or abstracts of articles may be of different significance, and, accordingly, may be given a different weight than frequency of appearance in the text of the articles. In other words, literature components considered or determined to be of a greater significance for ranking translations may be weighted higher than literature components considered or determined to be of less significance. The literature factor 310 for a translation 302 may then be determined to reflect a weighted summation or a weighted average of the frequencies of appearance of the translation in the different components of literature provided by the search results 306.

To determine the search criterion, the frequency determination engine 303 may use each translation 302 to search the search log 306 and to determine the number of times each translation 302 appears in the search log 306. The frequency engine 303 may determine or generate a respective search factor 311 for each of the translations 302 indicating the number of times each translation 302 appears in the search log 306. The frequency engine 303 may then provide the respective literature factor 310 and/or the respective search factor 311 determined for each of the translations 302 to a ranking engine 310.

The ranking engine 310 receives the literature factors 310 and/or the search factors 311 and utilizes the factors 310 and/or the factors 311 to determine a respective ranking score 314 for each of the translations 302. A ranking score 314 for a translation 302 may be determined, for example, based on the literature factor 310 determined for the translation 302. In this case, the frequency engine 303 may not need to generate the search factors 311, and functionality of determining search factors 311 for translations 302 may be omitted from the frequency engine 303. To determine a ranking score 314 for a translation 302 based on the literature factor 310 determined for the translation 302, the ranking engine 312 may normalize the literature factors 310 to obtain a respective value between 0 and 1 corresponding to each of the literature factor 310. A literature factor 310 for a translation 302 may be normalized with respect to literature factors 310 for the other translations 302. For example, each literature factor 310 may be mathematically divided by the greatest literature factor 310. Alternatively, literature factors 310 may be normalized in another suitable manner, such as by dividing each literature factor 310 by a predetermined value. Once determined, the normalized value of the literature factor 310 for a translation 302 may be used as the ranking score 314 for the translation 302.

Alternatively, a respective ranking score 314 for each translation 302 may be determined based on the search factor 311 determined for the translation 302. In this case, the frequency engine 303 may not need to generate the literature factors 310 for the translations 302, and functionality of determining literature factors for translations 302 may be omitted from the frequency engine 303. To determine a ranking score 314 for a translation 302 based on the search factor 311 determined for the translation 302, the ranking engine 310 may normalize the search factor 311 corresponding to the translation 302 to obtain a value between 0 and 1 for the search factor 311, and the normalized value of the search factor 311 may be used as the ranking score 314 for the translation 302. A search factor 311 for a translation 302 may be normalized, for example, with respect to search factors 311 for the other translations 302. For example, each search factor 311 may be divided by the greatest value of the search factors 311. Alternatively, search factors 311 may be normalized in another suitable manner, such as by dividing each search factor 311 by a predetermined value.

As yet another example, a respective ranking score 314 for each translation 302 may be determined based on both the literature factor 310 corresponding to the translation 302 and the search factor 311 corresponding to the translation 302. To determine a ranking score 314 for a translation 302 based on both the literature factor 310 and the search factor 311 determined for the translation 302, the ranking engine 311 may perform a mathematical summation of the literature factor 310 and the search frequency factor 311 corresponding to the translation 302 to determine a combined ranking score 314 for the translation 302. In some embodiments, upon determining a respective combined ranking score 324 for each translation 302, the ranking engine 310 may normalize the combined ranking scores to produce, for each of the translations 302, a respective normalized combined ranking score 314, or a combined ranking score 314 having a value between 0 and 1. A combined ranking score 314 determined for a translation 302 may be normalized, for example, with respect to combined ranking scores 314 determined for the other translations 302. For example, each combined ranking score 314 may be divided by the greatest value of the combined ranking scores 314. Alternatively, combined ranking scores 314 may be normalized in another suitable manner, such as by dividing each combined ranking score 314 by a predetermined value. In any event, the normalized value of the combine ranking score 314 for a translation 302 may then be used as the ranking score 314 for the translation 302.

As illustrated in FIG. 3, the ranking scores 314 are provided by the ranking engine 312 to a selection engine 314. The selection engine 314 may receive the respective ranking scores 314 for each of the translations 302, and may select a translation 318 from the possible translations 302 based on the received ranking scores 314. For example, the selection engine 314 may select a translation 318 as the translation 302 having the highest ranking score 314.

In some embodiments, the selection engine 300 may include learning capabilities that may improve accuracy of ranking performed by the ranking engine 312. For example, the selected translation 318 may be provided to the user, and the user may be requested to provide feedback for the selected translation 318. The user may provide feedback by indicating, for example, whether the selected translation 318 is an adequate translation for the query entered by the user or is not an adequate translation for the query entered by the user. When a user indicates that the translation is not adequate, the user may be given an option to provide an alternative translation for the query, for example a translation that the user believes to be a more adequate translation for the query. Further, in some embodiments, if the user indicates that the selected translation 318 is not an adequate translation for the query entered by the user, the selection engine 300 may select a second translation from the translations 302, and the second translation may then be presented to the user. The second translation may be the translation 302 having the second highest ranking 314 determining by the ranking engine 312, for example. The user may further be requested to provide feedback in regard to adequacy of the second selected translation.

In some embodiments, such user feedback may be utilized to improve accuracy of rankings produced by the ranking engine 312. For example, when a ranking score 314 for a translation 302 is determined based on both the literature factor 310 and the search factor 311 corresponding to the translation 302, the ranking score 314 may be determined based on a weighted summation of the literature factor 310 and the search factor 311 corresponding to the translation 302. In this case, weighting factors to be applied to literature factors 310 and the search factors 311 for producing ranking scores for subsequent translations provided to the ranking engine 312 may be determined and/or adjusted according to user feedback received for previous translations. For example, it may be determined, based on user feedback, that users generally favor translations that receive higher ranking scores based on the literature criterion to the translations that receive higher ranking scores based on the search criterion. In this case, a higher weighting factor may be applied to the literature factors 310, and a lower weighing factor may be applied to the search factors 311 for rankings subsequently performed by the ranking engine 312. In a similar manner, user feedback may be utilized to determine or adjust weighting factors to be applied to frequencies of appearance of translations in different components of literature (e.g., title, abstract, text, keywords, etc.). Further still, translations provided by users may be used to enhance translations subsequently produced by the selection engine 300. For example, translations provided by users may be utilized as possible translations for queries subsequently provided to the selection engine 300. In other embodiments, user feedback may be utilized to enhance accuracy of subsequent translations in other suitable manners.

Figure 4:
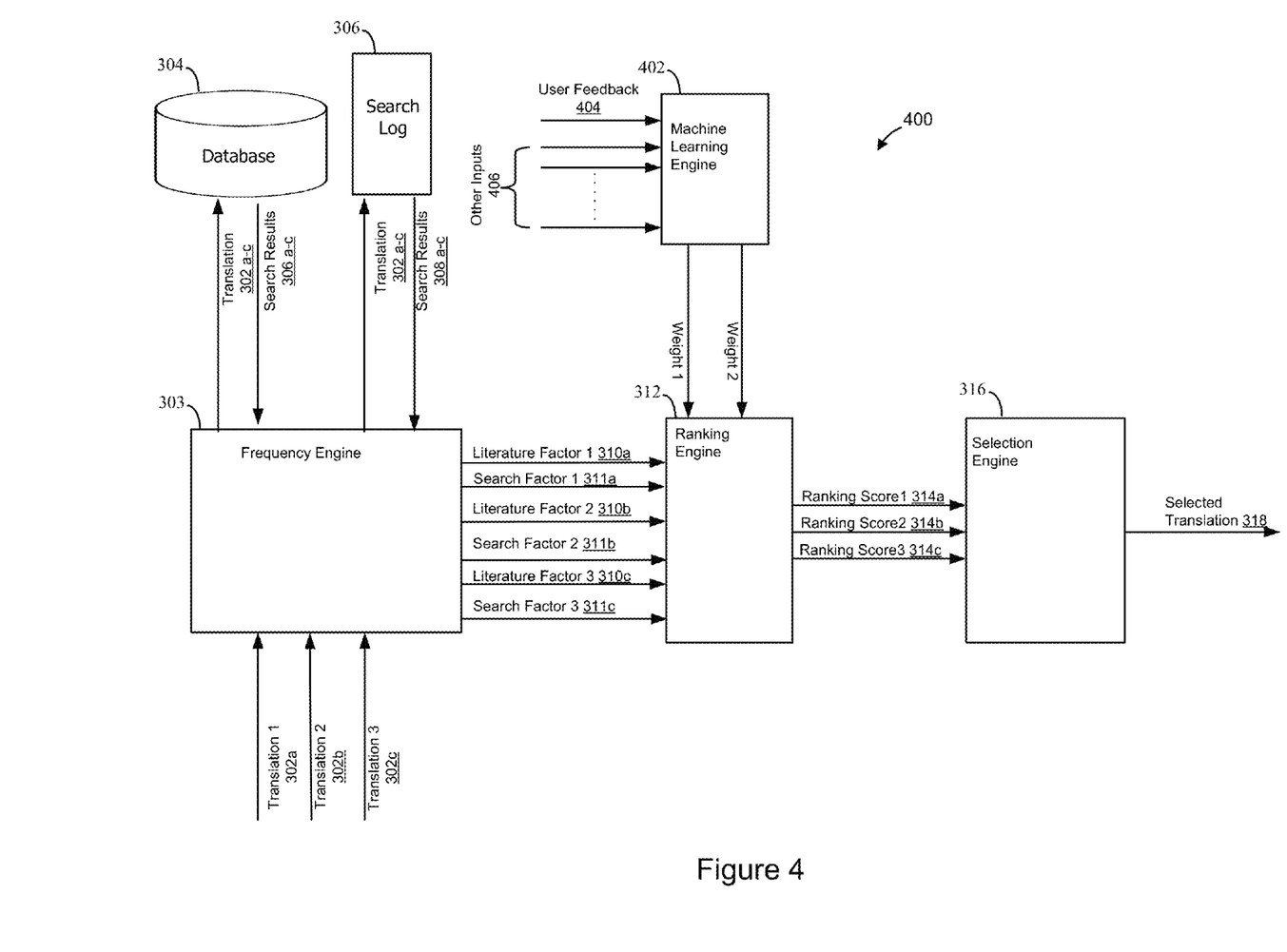
FIG. 4 is a block diagram of an example selection engine that includes machine learning capabilities for enhancing translation rankings.

FIG. 4 is a block diagram of an example selection engine 400 that includes machine learning capabilities for enhancing translation rankings, according to one example embodiment. The selection engine 400 is generally similar to the selection engine 300 of FIG. 3 and includes like-numbered components that, for the purpose of conciseness, are not discussed. The selection engine 400 includes a machine learning engine 402. The machine learning engine 402 may receive user feedback via a user feedback input 404 and may also receive other information related to translations processed by the selection engine 400 via "other inputs" 406. User feedback may include indications received from users in regard to adequacy of translations provided to the users. Additionally or alternatively, user feedback may include alternative translations provided by the users. The inputs 406 may include, for example, the literature factors 310 and the search factors 311 generated for the translations previously ranked by the ranking engine 312. The machine learning engine 402 may collect user feedback over a certain period of time, and may utilize the collected feedback to enhance accuracy of ranking subsequently performed by the ranking engine 312. For example, the machine learning engine 402 may assign and/or adjust weighting factors 408, 409 to be applied, respectively, to literature factors 310 and search factors 311 in subsequent rankings performed by the ranking engine 412. For example, as discussed above, if it is determined that users generally favor translations that receive higher ranking scores based on the literature criterion to the translations that receive higher ranking scores based on the search criterion, then the machine learning engine 402 may generate a higher weighting factor 408 to be applied to the literature factors 310 and a lower weighting factor 409 to be applied to the search factors 311 for subsequent rankings performed by the ranking engine 312.

Figure 5:
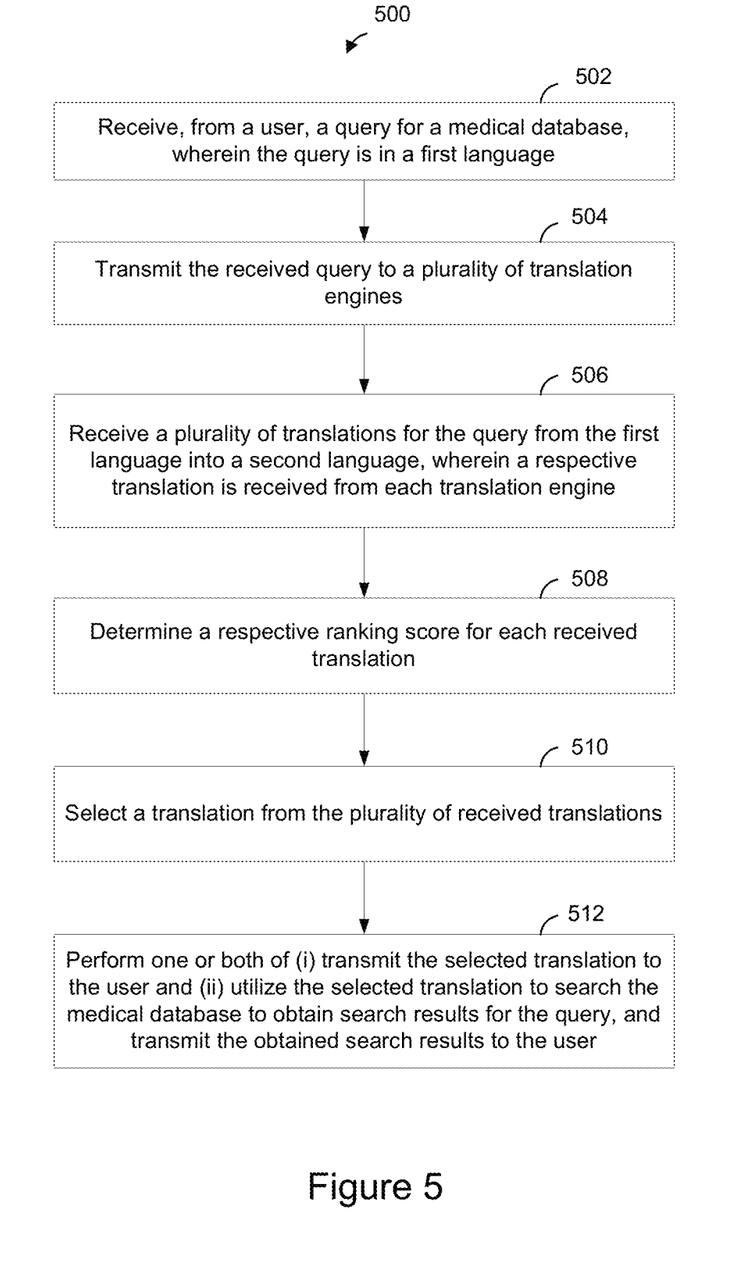
FIG. 5 is a block diagram of an example method for translation of a medical database query from a first language into a second language.

FIG. 5 is a flow chart of an example method 500 for translating a database query from a first language into a second language, according to an embodiment. Referring to FIG. 1, the method 500 may be implemented at least in part by the database system 100. For example, the translation module 160, when executed on the processor 122, may operate to perform all or portions of the method 500. Referring now to FIG. 2, the translation engine 200 may at least partially implement the method 500. Referring now to FIG. 3, the selection engine 300 may perform at least a portion of the method 500.

The method 500 begins at block 502 at which a query for a medical database is received. The query may be entered by a user into a web-enabled device, for example, and the query may be received at block 502 via a digital network. The method 500 generally produces a translation for the query received at block 502 from a first language into a second language. The first language is a foreign language that does not correspond to the language of literature contained in the medical database, and the second language is the language that corresponds to the language of literature contained in the medical database. At block 404, the received query is transmitted to a plurality of translation engines. The query is transmitted to the plurality of translation engines via, for example, the digital network through which the query was received at block 502. The plurality of translation engines be include translation engines provided by different on-line translation engine providers, for example.

At block 506, a respective translation of the query from the first language into the second language is received from each translation engine to which the query was transmitted at block 504. The received translations may be different and one or more of the received translations may be more accurate translations of the query than other received translations. The method 500 attempts to select a most accurate translation from the translations received at block 508. To this end, operations at block 508 rank the translations received at block 506 by determining a respective ranking score for each translation received at block 506. Rankings at block 508 are determined according to one or more criteria, such as the literature criterion and/or the search criterion described above. At block 510, a translation is selected from the plurality of translations received at block 506. For example, the translation having the highest ranking score determined at block 508 is selected at block 510.

The translation selected at block 510 may be transmitted to the user at block 512. Additionally or alternatively, the translation selected at block 510 may be utilized to search the medical database to obtain search results for the query from the medical database, and the search results may be transmitted to the user at block 512.

While various operations of a database system have been described herein in terms of "modules," "components," "engines," or "tools," it is noted that these terms are not limited to single units or functions. Moreover, functionality attributed to some of the modules, components, engines or tools described herein may be combined and attributed to fewer modules, components, engines, or tools. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

I claim:

1. A method for translation of a medical database query from a first language into a second language, the method executed by one or more computer processors programmed to perform the method, the method comprising:

receiving, at a processor from a user via a network, a query for a medical database, wherein the query is in the first language;

transmitting, by a processor, the received query to a plurality of translation engines;

receiving, at a processor, a plurality of translations for the query from the first language into the second language, wherein a respective translation is received from each translation engine in the plurality of translation engines;

determining, by the processor, a respective ranking score for each received translation of the plurality of received translations;

selecting, by the processor and based on the determined ranking scores, a translation from the plurality of translations; and performing one or both of:
  (i) transmitting, by a processor and via the network, the selected translation to the user, and
  (ii) utilizing, by a processor, the selected translation to search the medical database to obtain search results for the query, and transmitting, by a processor and via the network, the obtained search results to the user, wherein determining the respective ranking score for each translation comprises determining the respective ranking score based on (i) a literature criterion, the literature criterion indicating a frequency of appearance of the translation in a body of literature contained in the medical database, (ii) a search log criterion, the search log criterion indicating a frequency of appearance of the translation in a record of queries previously entered into the medical database, or (iii) both a literature criterion, the literature criterion indicating a frequency of appearance of the translation in a body of literature contained in the medical database, and a search log criterion, the search log criterion indicating a frequency of appearance of the translation in a record of queries previously entered into the medical database.

2. A method according to claim 1, wherein determining the respective ranking score, when the respective ranking score is determined at least in part on the literature criterion, includes determining a literature factor for the translation based on one of (i) a weighted summation or (ii) a weighted average of respective frequencies of appearance of the translation in different components of literature contained in the medical database.

3. A method according to claim 1, wherein determining the respective ranking score for each translation, when the respective ranking score is determined based on the literature criterion, comprises:
  determining a respective literature factor that indicates frequency of appearance of the translation in the body of literature contained in the medical database;
  normalizing the respective literature factor with respect to literature factors determined for the other translations in the plurality of translations to produce a respective normalized literature factor for the translation; and
  utilizing the respective normalized literature factor for the translation as the ranking score for the translation.

4. A method according to claim 1, wherein determining the respective ranking score for each translation, when the respective ranking score is determined based on the search criterion, comprises:
  determining a respective search factor that indicates frequency of appearance of the translation in the record of queries previously entered into the medical database;
  normalizing the respective search factor with respect to search factors determined for the other translations in the plurality of translations to produce a normalized search factor for the translation; and
  utilizing the normalized search factor for the translation as the ranking score for the translation.

5. A method according to claim 1, wherein determining the respective ranking score, when the respective ranking score is determined based on both the literature criterion and the search criterion comprises:
  determining a respective literature factor that indicates frequency of appearance of the translation in the body of literature;
  determining a respective search factor that indicates frequency of appearance of the translation in the record of queries previously entered into the medical database;
  determining a respective combined factor by performing a mathematical summation of the respective literature factor and the respective search factor;
  normalizing the respective combined factor with respect to combined factors determined for the other translations in the plurality of translations to produce a respective normalized combined factor for the translation; and
  utilizing the respective normalized combined factor for the translation as the ranking score for the translation.

6. A method according to claim 1, wherein determining the respective ranking score, when the respective ranking score is determined based on both the literature criterion and the search criterion comprises:
  determining a respective literature factor that indicates frequency of appearance of the translation in the body of literature;
  determining a respective search factor that indicates frequency of appearance of the translation in the record of queries previously entered into the medical database;
  determining a respective weighting factor to be applied to (i) the literature factor and (ii) the search log factor;
  applying corresponding respective weighting factors to the respective literature factor and the respective search factor to generate a respective weighted literature factor and a respective weighted search log factor;
  determining a respective combined factor by performing a mathematical summation of the respective weighted literature factor and the respective weighted search factor;
  normalizing the respective combined factor with respect to combined factors determined for the other translations to produce a normalized combined factor for the translation; and
  utilizing the normalized combined factor for the translation as the ranking score for the translation.

7. A method according to claim 5, further comprising:
  requesting the user to provide feedback for the presented translation by indicating whether the translation is (i) adequate or (ii) not adequate;
  receiving the requested feedback from the user; and
  adjusting ranking scores for subsequent translations based on the received user feedback.

8. A method according to claim 7, wherein adjusting ranking scores for subsequent translations comprises adjusting, based on the feedback, the respective weighting factor to be applied to both (i) the literature criterion and (ii) the search log criterion.

9. A method according to claim 7, further comprising:
  in response to receiving user feedback indicating that the selected translation is not adequate, performing one or both of (i) selecting a second translation from the plurality of translations and requesting the user to provide feedback for the second translation and (ii) requesting the user to provide an alternative translation for the query.

10. A method according to claim 9, further comprising further adjusting ranking scores for subsequent translations based on the user feedback.

11. A non-transitory computer-readable storage medium having stored thereon a set of instructions, executable by a processor, for translation of a medical database query from a first language into a second language, the instructions comprising:
- instructions for receiving a query for a medical database, wherein the query is in the first language;
- instructions for transmitting the received query to a plurality of translation engines;
- instructions for receiving a plurality of translations for the query from the first language into the second language, wherein a respective translation is received from each translation engine in the plurality of translation engines;
- instructions for determining a respective ranking score for each received translation of the plurality of received translations; and
- instructions for selecting, based on the determined ranking scores, a translation from the plurality of translations; and
- instruction for performing one or both of:
  (i) transmitting the selected translation to the user, and
  (ii) utilizing the selected translation to search the medical database to obtain search results for the query, and transmitting the obtained search results to the user,
- wherein instructions for determining the respective ranking score for each translation comprise instructions for determining the respective ranking score based on (i) a literature criterion, the literature criterion indicating a frequency of appearance of the translation in a body of literature contained in the medical database, (ii) a search log criterion, the search log criterion indicating a frequency of appearance of the translation in a record of queries previously entered into the medical database, or (iii) both a literature criterion, the literature criterion indicating a frequency of appearance of the translation in a body of literature contained in the medical database, and a search log criterion, the search log criterion indicating a frequency of appearance of the translation in a record of queries previously entered into the medical database.

12. The non-transitory computer-readable storage medium of claim 11, wherein instruction determining the respective ranking score, when the respective ranking score is determined at least in part on the literature criterion, include instructions for determining a literature factor the translation based on one of (i) a weighted summation or (ii) a weighted average of respective frequencies of appearance of the translation in different components of literature contained in the medical database.

13. The non-transitory computer-readable storage medium of claim 11, wherein the instructions for determining the respective ranking score, when the respective score is determined based on the literature criterion, further comprise:
- instructions for determining a respective literature factor that indicates frequency of appearance of the translation in the body of literature contained in the medical database;
- instructions for normalizing the respective literature factor with respect to literature factors determined for the other translations in the plurality of translations to produce a respective normalized literature factor for the translation; and
- instructions for utilizing the respective normalized literature factor for the translation as the ranking score for the translation.

14. The non-transitory computer-readable storage medium of claim 11, wherein instructions for determining the respective ranking score, when the respective score is determined based on the search criterion, further comprise:
- instructions for determining a respective search factor that indicates frequency of appearance of the translation in the record of queries previously entered into the medical database;
- instructions for normalizing the respective search factor with respect to search factors determined for the other translations in the plurality of translations to produce a normalized search factor for the translation; and
- instructions for utilizing the normalized search factor for the translation as the ranking score for the translation.

15. The non-transitory computer-readable storage medium of claim 14, further comprising instructions for:
- requesting the user to provide feedback for the presented translation by indicating whether the translation is (i) adequate or (ii) not adequate;
- receiving the requested feedback from the user; and
- adjusting ranking scores for subsequent translations based on the received user feedback.

16. The non-transitory computer-readable storage medium of claim 15, wherein the instructions for adjusting ranking scores for subsequent translations further comprise adjusting, based on the feedback, the respective weighting factor to be applied to both (i) the literature criterion and (ii) the search log criterion.

17. The non-transitory computer-readable storage medium of claim 15, further comprising instructions for:
- in response to receiving user feedback indicating that the selected translation is not adequate, performing one or both of (i) selecting a second translation from the plurality of translations and requesting the user to provide feedback for the second translation and (ii) requesting the user to provide an alternative translation for the query.

18. The non-transitory computer-readable storage medium of claim 17, further comprising instructions for further adjusting ranking scores for subsequent translations based on the user feedback.

19. The non-transitory computer-readable storage medium of claim 11, wherein the instructions for determining the respective ranking score, when the respective score is determined based on both the literature criterion and the search criterion, further comprise:
- instructions for determining a respective literature factor that indicates frequency of appearance of the translation in the body of literature;
- instructions for determining a respective search factor that indicates frequency of appearance of the translation in the record of queries previously entered into the medical database;
- instructions for determining a respective combined factor by performing a mathematical summation of the respective literature factor and the respective search factor;
- instructions for normalizing the respective combined factor with respect to combined factors determined for the other translations in the plurality of translations to produce a respective normalized combined factor for the translation; and
- instructions for utilizing the respective normalized combined factor for the translation as the ranking score for the translation.

20. The non-transitory computer-readable storage medium of claim 11, wherein instructions for determining the respective ranking score, when the respective score is determined based on both the literature criterion and the search criterion, further comprise:
- instructions for determining a respective literature factor that indicates frequency of appearance of the translation in the body of literature;
- instructions for determining a respective search factor that indicates frequency of appearance of the translation in the record of queries previously entered into the medical database;
- instructions for determining a respective weighting factor to be applied to (i) the literature factor and (ii) the search log factor;
- instructions for applying corresponding respective weighting factors to the respective literature factor and the respective search factor to generate a respective weighted literature factor and a respective weighted search log factor;
- instructions for determining a respective combined factor by performing a mathematical summation of the respective weighted literature factor and the respective weighted search factor;
- instructions for normalizing the respective combined factor with respect to combined factors determined for the other translations to produce a normalized combined factor for the translation; and
- instructions for utilizing the normalized combined factor for the translation as the ranking score for the translation.

* * * * *